(12) United States Patent
Kato

(10) Patent No.: US 9,701,310 B2
(45) Date of Patent: Jul. 11, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventor: Hirokazu Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,209

(22) PCT Filed: Nov. 12, 2014

(86) PCT No.: PCT/IB2014/002409
§ 371 (c)(1),
(2) Date: Apr. 26, 2016

(87) PCT Pub. No.: WO2015/071732
PCT Pub. Date: May 21, 2015

(65) Prior Publication Data
US 2016/0272205 A1 Sep. 22, 2016

(30) Foreign Application Priority Data
Nov. 13, 2013 (JP) .................................. 2013-235372

(51) Int. Cl.
*B60W 30/16* (2012.01)
*B60W 10/06* (2006.01)
(Continued)

(52) U.S. Cl.
CPC ............... *B60W 30/16* (2013.01); *B60T 7/12* (2013.01); *B60T 7/122* (2013.01); *B60T 7/22* (2013.01);
(Continued)

(58) Field of Classification Search
CPC ...... B60W 30/16; B60W 10/06; B60W 10/18; B60W 30/17; B60W 30/18018;
(Continued)

(56) References Cited

U.S. PATENT DOCUMENTS

| 6,193,332 | B1 * | 2/2001 | Ono  | B60T 7/122 188/DIG. 2 |
| 6,346,064 | B1 * | 2/2002 | Hada | B60K 6/543 477/171 |

(Continued)

FOREIGN PATENT DOCUMENTS

| DE | 19502154 A1 | 8/1996 |
| DE | 10152632 A1 | 5/2003 |

(Continued)

OTHER PUBLICATIONS

Sungwoo et al., "Model-free control of automotive engine and brake for Stop-and-Go scenarios," Year: 2009, pp. 3622-3627.*

(Continued)

*Primary Examiner* — Tuan C. To
(74) *Attorney, Agent, or Firm* — Oliff PLC

(57) ABSTRACT

A control apparatus for a vehicle includes: an inter-vehicle distance control unit that performs inter-vehicle distance control with respect to a preceding vehicle; a stop-restart unit that stops an engine if the host vehicle is stopped and an engine stop condition is satisfied and that restarts the engine if a restart condition is satisfied; a braking force maintenance unit that maintains a braking force which stops the vehicle in idle state; and a braking force increase unit that increases the braking force maintained by the braking force maintenance unit if the vehicle is stopped by the inter-vehicle distance control unit.

6 Claims, 12 Drawing Sheets

(51) Int. Cl.
  *B60W 10/08* (2006.01)
  *B60T 7/12* (2006.01)
  *B60W 30/17* (2012.01)
  *B60W 30/18* (2012.01)
  *B60T 7/22* (2006.01)
  *B60W 10/18* (2012.01)

(52) U.S. Cl.
  CPC ............ *B60W 10/06* (2013.01); *B60W 10/18* (2013.01); *B60W 30/17* (2013.01); *B60W 30/18018* (2013.01); *B60W 30/18118* (2013.01); *B60T 2201/022* (2013.01)

(58) Field of Classification Search
  CPC ..... B60W 30/18118; B60T 7/12; B60T 7/122; B60T 7/22; B60T 2201/022
  See application file for complete search history.

(56) References Cited

U.S. PATENT DOCUMENTS

| | | | | |
|---|---|---|---|---|
| 6,370,466 | B1* | 4/2002 | Hada | B60T 7/122 188/110 |
| 7,734,403 | B2 | 6/2010 | Baijens et al. | |
| 7,890,243 | B2 | 2/2011 | Abendroth | |
| 8,849,534 | B2* | 9/2014 | Saito | B60T 7/12 701/112 |
| 2004/0104619 | A1* | 6/2004 | Manaka | B60T 7/122 303/122.11 |
| 2008/0133103 | A1 | 6/2008 | Meske et al. | |
| 2010/0222973 | A1* | 9/2010 | Senda | B60W 10/02 701/54 |
| 2011/0112740 | A1* | 5/2011 | Hashimoto | F02D 17/02 701/70 |
| 2011/0169323 | A1 | 7/2011 | Tseng et al. | |
| 2011/0256981 | A1* | 10/2011 | Saito | B60W 10/06 477/183 |
| 2012/0022773 | A1* | 1/2012 | Ohmori | B60T 7/122 701/113 |
| 2012/0083389 | A1* | 4/2012 | Morita | B60W 10/184 477/185 |
| 2015/0073675 | A1* | 3/2015 | Malone | B60W 10/06 701/70 |
| 2015/0307069 | A1* | 10/2015 | Horii | B60T 7/12 701/70 |

FOREIGN PATENT DOCUMENTS

| | | | |
|---|---|---|---|
| DE | 102005009929 A1 | | 9/2006 |
| DE | 102007015123 A1 | | 10/2008 |
| DE | 102007061940 A1 | | 11/2008 |
| DE | 102008001691 A1 | | 11/2009 |
| JP | 2005105894 A | * | 4/2005 |
| JP | 2007-331533 A | | 12/2007 |
| JP | 2012047153 A | * | 3/2012 ............ B60T 13/662 |
| JP | 2012071790 A | * | 4/2012 ................ B60T 7/12 |
| JP | 2012-206593 A | | 10/2012 |

OTHER PUBLICATIONS

Myunghee et al., "Proactive Stop and Start Technology for High Gas Mileage of the Used Car," Year: 2010, pp. 1-5.*

* cited by examiner

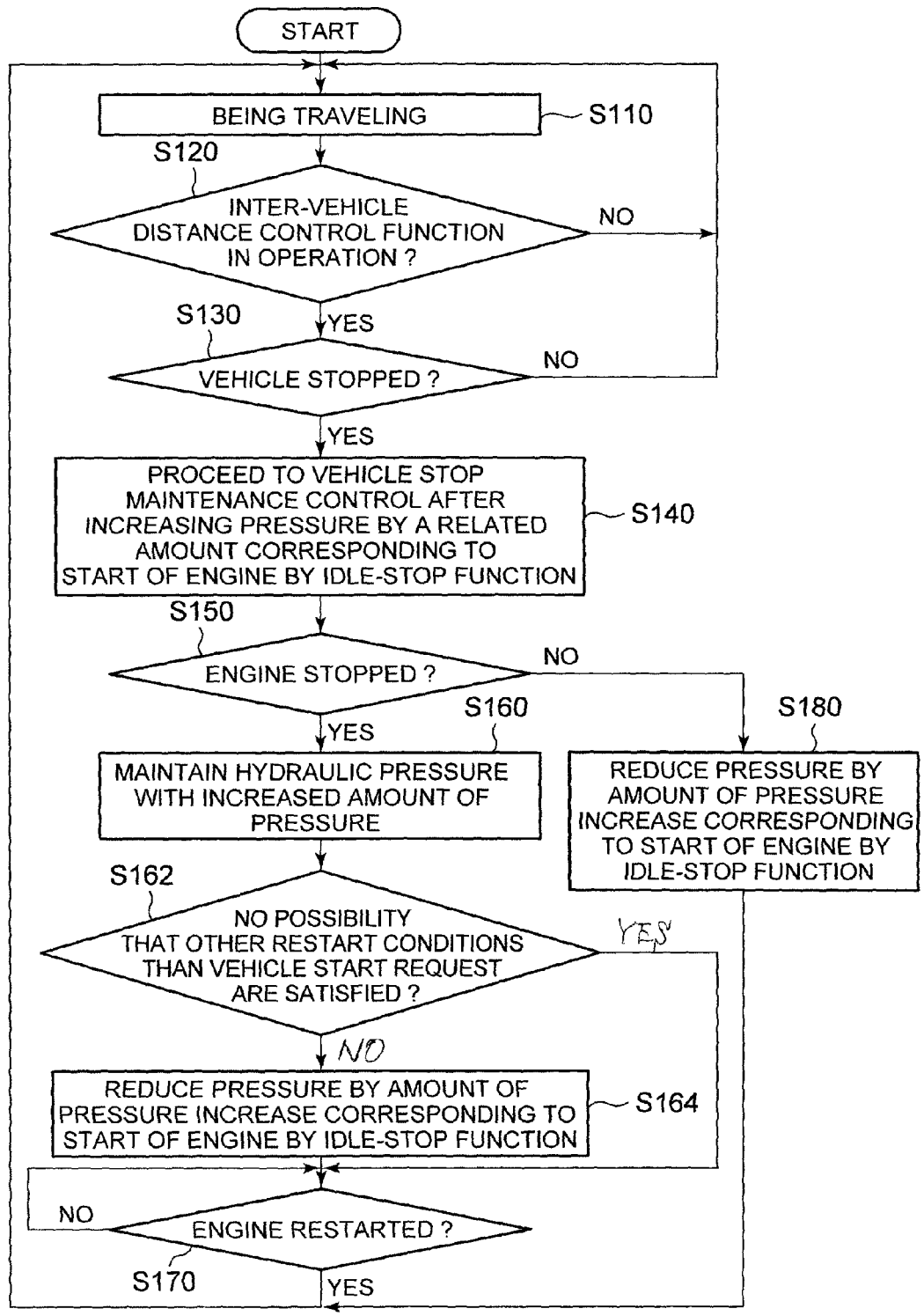

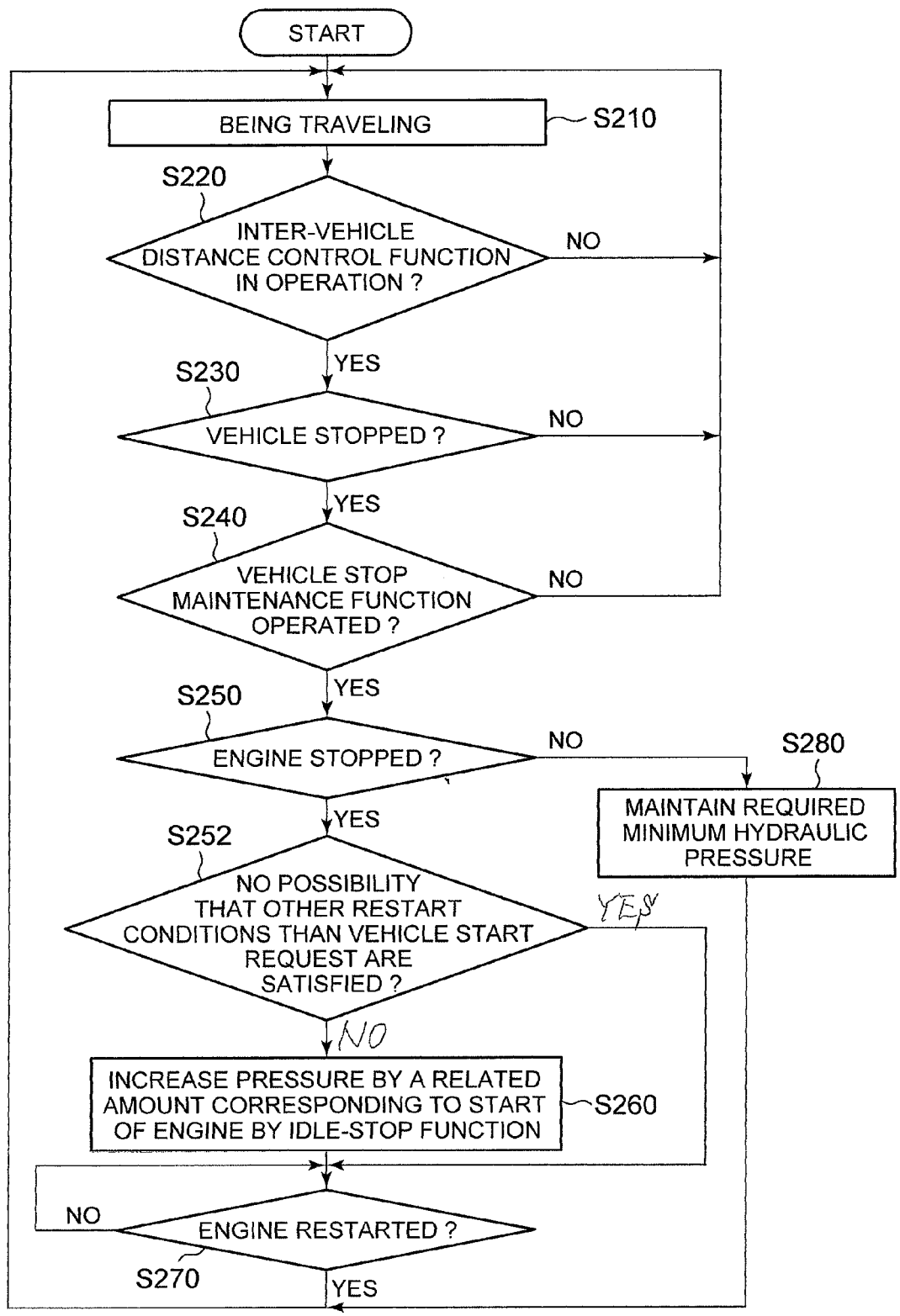

CONTROL APPARATUS FOR VEHICLE

BACKGROUND OF THE INVENTION

1. Field of the Invention

The present invention relates to a control apparatus for a vehicle for controlling braking force while the vehicle is stopped.

2. Description of Related Art

An idle-stop technology in which the engine is stopped during stop of the vehicle when a predetermined condition is satisfied, is known. Also, there has been known an engine-restart technology in which the engine which has been stopped by the idle-stop technology is restarted when the driver's foot is moved away from the brake pedal. The both technologies are collectively called idle-stop function, start & stop function, engine • automatically • start • stop function, or the like (hereinafter, simply referred to as idle-stop function).

In addition, there has been known a technology in which a traveling following a preceding vehicle with an inter-vehicle distance corresponding to vehicle speed is performed while the preceding vehicle is captured, and a traveling at a preset constant speed is performed if no preceding vehicle is captured, and which is referred to as constant-speed traveling • inter-vehicle distance control function and/or ACC (Adaptive Cruise Control) or the like (hereinafter, referred to as inter-vehicle distance control function). Moreover, a full vehicle speed range inter-vehicle distance control function in which the host vehicle is also stopped if the preceding vehicle is slowed down to stop and the host vehicle is also started if the preceding vehicle is started, is known as a mode of the inter-vehicle distance control function.

By equipping the vehicle with the idle-stop function and the full vehicle speed inter-vehicle distance control function, it is possible to enable the idle-stop function to stop the engine after the host vehicle is stopped by the full vehicle speed inter-vehicle distance control function (for example, refer to Japanese Patent Application Publication No. 2012-206593 (JP 2012-206593 A)). In JP 2012-206593 A, a cruise control system is disclosed, in which when the host vehicle is stopped by the full vehicle speed inter-vehicle distance control function, a holding force for keeping the vehicle in the stop state is generated, and when a condition to automatically stop the engine is satisfied, the engine of the host vehicle is automatically stopped.

However, in JP 2012-206593 A, since only the holding force for keeping the stop state is generated, there is a problem that the vehicle is likely to move when the engine is restarted by the idle-stop function.

FIG. 1A is a structural view showing that the rotation of the engine is transmitted up to the tire. For the vehicle which has been stopped by the full vehicle speed inter-vehicle distance control function, since the shift lever is set at D position, the rotation of the engine is transmitted to the tire via a torque converter and a transmission.

FIG. 1B is an exemplary diagram explaining the relationship between the driving force and the braking force. The vehicle which has been stopped by the full vehicle speed inter-vehicle distance control function is stopped with a minimum braking force required for maintaining the stop state of the vehicle. Since the opening degree of the throttle is zero, the engine is in an idle state, and thus the braking force is a braking force required at the idle-stop of the vehicle.

On the other hand, for the engine which is just restarted by the idle-stop function, since its rotation speed is higher than that in the idle state (due to the speed increase of the engine), a driving force larger than the braking force for stopping the vehicle is generated. As a result, there is a possibility that the driving force surmounts the braking force to move the vehicle.

Although it may be considered that the braking force is increased in advance by anticipating this inconvenience, since the lower the pressure of the braking fluid for generating the braking force is, the shorter the time taken to reduce the pressure is, the responsiveness at the vehicle start by the full vehicle speed inter-vehicle distance control function will be increased. Thus, it is not preferable to increase the braking force. In addition, increasing the braking force is not preferable due to its useless energy consumption.

SUMMARY OF THE INVENTION

The present invention provides a control apparatus for a vehicle, which restrains the vehicle from moving when the vehicle has been stopped by the inter-vehicle distance control function and the engine is restarted by the idle-stop function.

The control apparatus for a vehicle according to a first aspect of the invention is characterized by including: an inter-vehicle distance control unit that performs inter-vehicle distance control with respect to a preceding vehicle; a stop-restart unit that stops an engine if the host vehicle is stopped and an engine stop condition is satisfied and that restarts the engine if a restart condition is satisfied; a braking force maintenance unit that maintains a braking force which stops the vehicle in idle state; and a braking force increase unit that increases the braking force maintained by the braking force maintenance unit if the vehicle is stopped by the inter-vehicle distance control unit.

It is possible to provide a control apparatus for a vehicle, which restrains the vehicle from moving when the vehicle has been stopped by the inter-vehicle distance control function and the engine is restarted by the idle-stop function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 11 is an exemplary diagram for explaining the operation procedure of the control apparatus for a vehicle (Embodiment 3); and FIG. 12 is an exemplary diagram for explaining the operation procedure of the control apparatus for a vehicle (Embodiment 3).

DETAILED DESCRIPTION OF EMBODIMENTS

Hereinafter, modes for implementing the invention will be described with reference to the attached drawings.

Figure 1A:
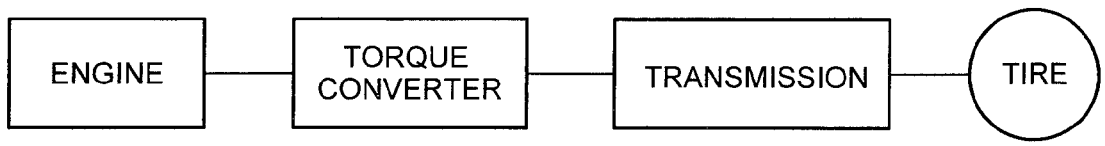
FIG. 1A is an exemplary diagrams for illustrating the related art.
Figure 1B:
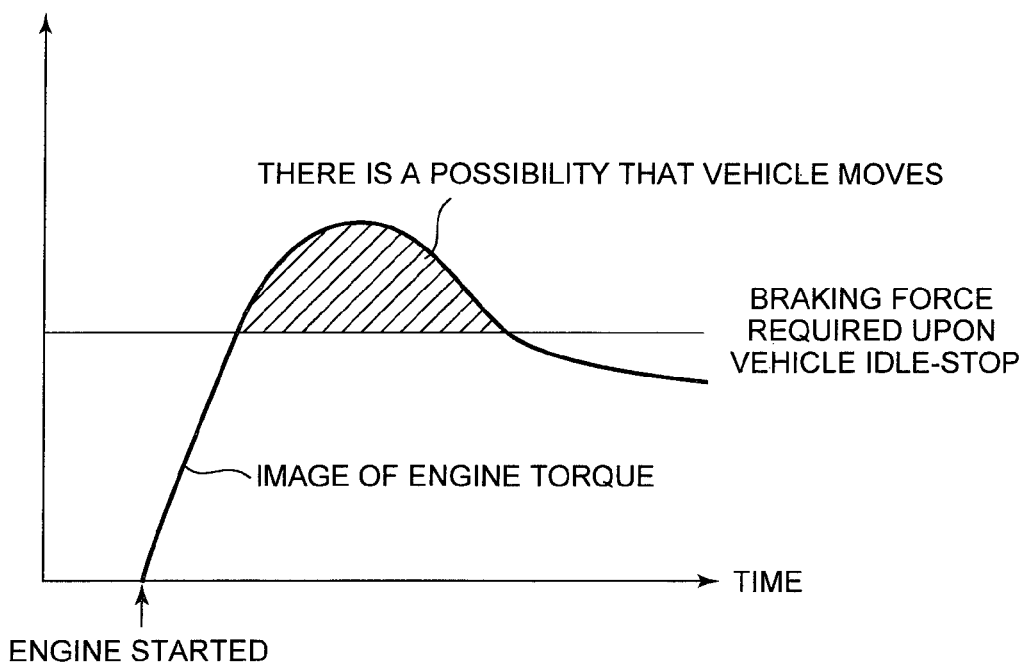
FIG. 1B is an exemplary diagrams for illustrating the related art.
Figure 2A:
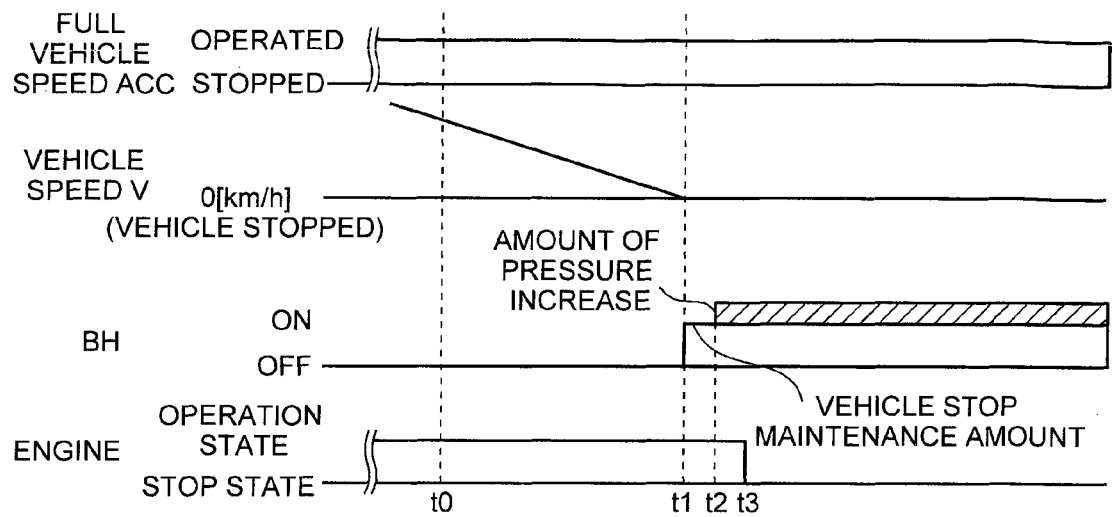
FIG. 2A is an exemplary sequential diagram showing the schematic operation procedure of the control apparatus for a vehicle.

FIG. 2A is an exemplary sequential diagram showing the schematic operation procedure of the control apparatus for a vehicle according to the present embodiment. Time t0: the vehicle is performing a traveling following a preceding vehicle in a state where the full vehicle speed inter-vehicle distance control function is operated (a state where the following traveling is possible). Of course, the engine is ON (in operation state). Hereinafter, the full vehicle speed inter-vehicle distance control function is simply referred to as inter-vehicle distance control function. Time t1: since the preceding vehicle is stopped, the vehicle is stopped by the inter-vehicle distance control function. The vehicle is stopped by the inter-vehicle distance control function, such that the braking hold function is put into operation. The braking hold function is a technology in which the braking state of the vehicle is maintained to a minimum extent even if the driver removes his foot away from the brake pedal after the vehicle has stopped, and sometimes is also referred to as hill-start assist system (hereinafter, simply referred to as vehicle stop maintenance function), or the like. Hereinafter, the situation in which the vehicle stop maintenance function is operated is referred to as ON, and the situation in which the vehicle stop maintenance function is cancelled (the braking force is released) is referred to as OFF. Time t2: then, in the case where the vehicle stop maintenance function is operated, in addition to the braking force for maintaining the vehicle stop state (white portion in the figure), the control apparatus for a vehicle according to the present embodiment will also increase the wheel cylinder pressure to generate a braking force which restrains the vehicle from moving when the engine is started by the idle-stop function (hatch line portion in the figure). Time t3: since the vehicle is stopped, the idle-stop function determines whether or not an engine stop condition is satisfied, and if yes, the engine is stopped.

Therefore, even in the case where the engine is stopped by the idle-stop function, since the wheel cylinder pressure is increased, it is possible to suppress the case where the vehicle moves when the engine is restarted by the idle-stop function.

Moreover, in FIG. 2A, increase of the wheel cylinder pressure for preventing the vehicle moving is performed before the engine is stopped, however the increase of pressure may be performed at any time before the engine is restarted.

Figure 2B:
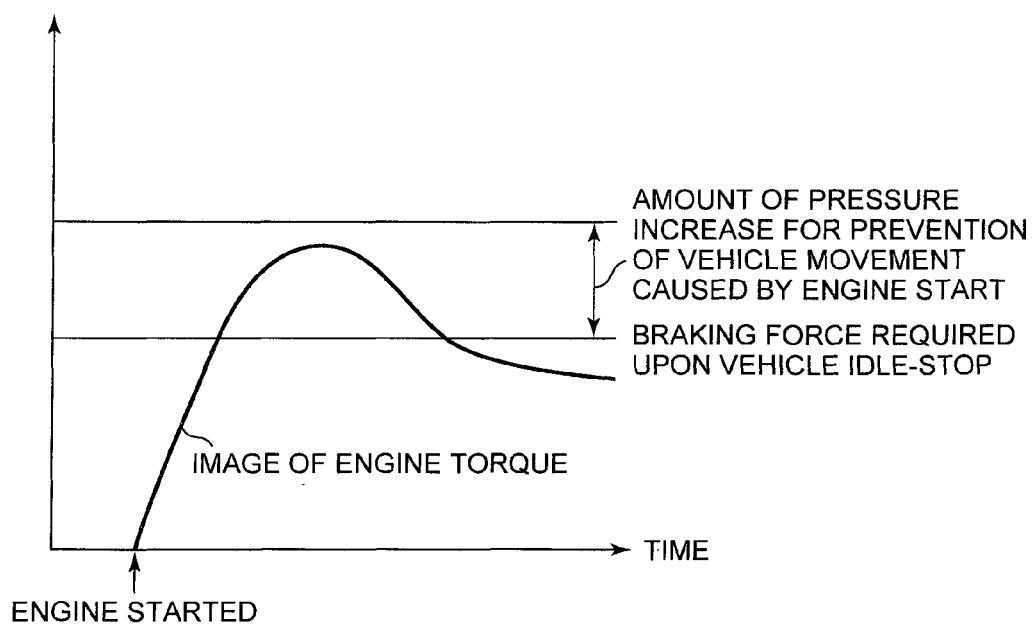
FIG. 2B is an exemplary sequential diagram showing the schematic operation procedure of the control apparatus for a vehicle.

FIG. 2B is an exemplary diagram for explaining the relationship between the driving force and the braking force. The vehicle stop maintenance function is used to increase the wheel cylinder pressure for preventing the vehicle moving caused by start of the engine, such that even if the engine speed is increased, it is possible to prevent the driving force from becoming larger than the braking force.

Hereinafter, assuming that the braking force is able to be controlled by the wheel cylinder pressure, the control of the braking force by using the wheel cylinder pressure will be described. However, the braking force can also be controlled by controlling the master cylinder pressure, and the present embodiment can be applied to a vehicle in which the braking force is controlled at least partially by hydraulic pressure.

Figure 3:
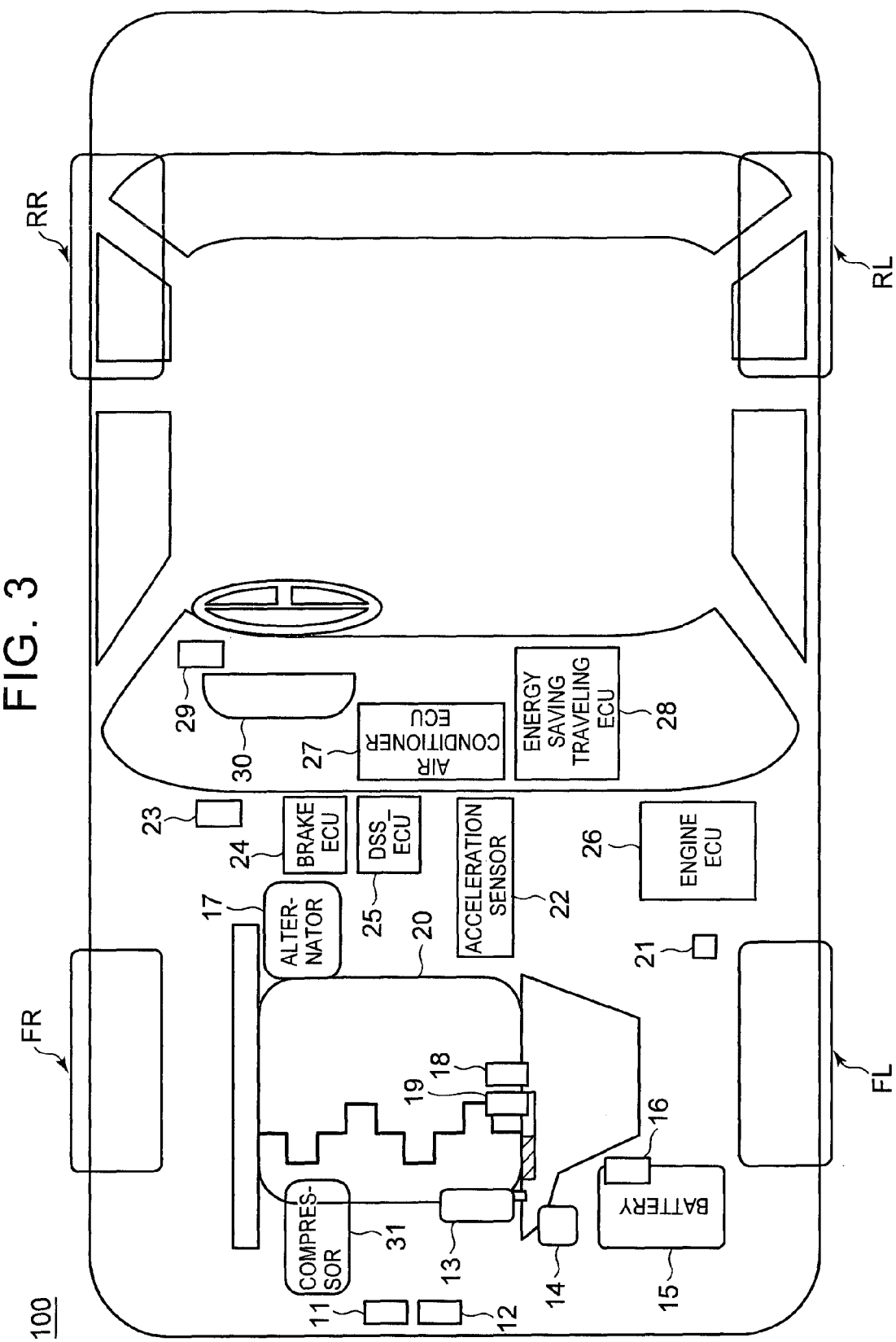
FIG. 3 is an exemplary block diagram of the units • functions of the control apparatus for a vehicle.

(Structural example) FIG. 3 is an exemplary block diagram of the units •☐functions of the control apparatus 100 for a vehicle according to the present embodiment. These units • functions are not necessarily all used for the idle-stop function, the vehicle stop maintenance function, the inter-vehicle distance control function, and only schematically show the configuration position and shape. In addition, ECUs and/or sensors are communicatively connected via onboard networks such as CAN (Controller Area Network), or via dedicated lines.

The battery 15 is a power storage device (secondary battery) capable of charging and discharging. The battery 15 is, for example, a lead battery, which supplies power to an electric oil pump 14, a brake hydraulic pump (not shown), a series-connected starter 13, and various ECUs (Electronic Control Units). In addition, the battery 15 is charged by the power generated by an alternator 17. The SOC of the battery 15 is monitored by a battery sensor 16.

The engine 20 is equipped with the electric oil pump 14, the series-connected starter 13, a compressor 31 for an air conditioner, the alternator 17, a cam angle sensor 18, and a crank angle sensor 19. The series-connected starter 13 is used to start the engine 20 by consuming the power from the battery 15. In the case where the engine rotation speed is relatively high, the series-connected starter 13 pushes out a pinion after bringing it into rotation to make it engage with a ring gear, such that the engine 20 can be started even during rotation of the engine. Also, a starter not having the function to rotate the pinion may be equipped.

The alternator 17 is a power generator which generates power by being rotated in associated with rotation of the crankshaft. A transmission belt is wound around the crankshaft and the rotation shaft of the alternator 17, and the alternator 17 is rotated by the power of the engine 20. The power generated by the alternator 17 is charged into the battery 15.

In addition, a transmission belt is wound around the compressor 31 of the air conditioner and the crankshaft, and the compressor 31 is rotated by the power of the engine 20.

The electric oil pump 14 is driven by the battery 15, and circulates the engine oil when the engine is stopped, whereby accumulation of the engine oil during the stop of the engine is prevented, or the engine 20 is cooled during the stop of the engine.

The crank angle sensor 19 detects the crank angle and the cam angle sensor 18 detects the cam angle. By identifying the crank angle and the cam angle, the so-called cylinder determination can be performed. For example, in a four-cylinder engine, since the timing at which the respective cylinders arrive at the top-dead point is identified, the cylinder in which fuel is injected and combusted can be determined upon start of the engine. In addition, the crank angle sensor 19 is used to detect the engine rotation speed.

An engine hood lock SW12 and a distance sensor 11 are mounted in the front of the vehicle. The engine hood lock SW12 is a sensor to detect whether or not the engine hood is locked. When the hood is opened, start of the engine is disabled by the idle-stop function because the driver cannot recognize the front.

The distance sensor 11 is, for example, a millimeter wave radar, a laser radar, a stereo camera, a TOF (Time of Flight) camera, or the like, and is a sensor to detect the distance to an object. Besides the distance, relative speed and orientation can also be obtained therefrom. The inter-vehicle distance control function makes the host vehicle to follow the preceding vehicle by maintaining a distance corresponding to the vehicle speed of the host vehicle.

The engine ECU 26 is a ECU for controlling the engine 20, and is connected with a series-connected starter driving relay 21. If the engine ECU 26 energizes the series-connected starter driving relay 21, the series-connected starter 13 operates to start the engine 20.

The brake ECU 24 controls the brake ACT to be described later to increase, reduce, or maintain the wheel cylinder pressure of the respective wheels. The brake ECU 24 performs the control for maintaining the vehicle stop state by these functions. In addition, the VSC (Vehicle Stability Control), ABS control, TRC control, and so on, can also be performed. Moreover, the VCS control controls the wheel cylinder pressure of the respective wheels in such a manner that unstable vehicle behaviors such as excessive under-steering, over-steering, of the host vehicle are prevented. In addition, the brake ECU 24 and the brake ACT are capable of being configured to supply hydraulic pressure accumulated in an accumulator or the like to the respective wheel cylinders according to the depression force on the brake pedal by the driver, so as to brake the respective wheels.

The brake booster negative pressure sensor 23 is a sensor to detect a booster negative pressure generated by the negative pressure of the intake air of the engine 20. By using this negative pressure, the depression force on the brake pedal by the driver can be boosted, so that the brake pedal can be reliably depressed by the driver. If the booster negative pressure becomes larger (approximate to the atmospheric pressure), the idle-stop function will start the engine 20 to reduce the booster negative pressure, so as to prepare for the driver's operation on the brake pedal.

The acceleration sensor 22 is a sensor to detect the acceleration in fore-aft direction or in right-left direction, and is used to calculate the inclination angle (slope) of the road surface on which the vehicle is stopped. The braking force for keeping the vehicle stop state is corrected according to the slope.

The air conditioner ECU 27 performs the so-called air conditioning control that controls the temperature inside the cabin to be a temperature set by the driver. In the case where the engine has been stopped by the idle-stop function, since the compressor 31 of the air conditioner is stopped, the air conditioner is switched to air blowing function. In addition, during the air conditioning control performed by the air conditioner ECU 27 in the state where the difference between the set temperature and the target temperature is large, the idle-stop function does not stop the engine 20.

The energy saving traveling ECU 28 is an ECU to control the idle-stop function. In the energy saving ECU 28, a function to boost the voltage of the battery is integrated. When the engine 20 is started by the idle-stop function, since the voltage of the battery is lowered by the driving of the series-connected starter 13, the energy saving traveling ECU 28 boosts the voltage of the battery in order to ensure the required voltage for other auxiliaries (ECUs, in-cabin lights, and so on).

The energy saving traveling canceling SW29 is a switch for canceling the idle-stop function. If the driver operates the energy saving traveling canceling SW29 to be ON, the idle-stop function is turned off.

The DSS (Driver Support) _ECU 25 is an ECU for performing inter-vehicle distance control while following the preceding vehicle. That is, when a preceding vehicle is detected, the following traveling is performed in such a manner that the distance to the preceding vehicle becomes a target inter-vehicle distance corresponding to the vehicle speed. In the case where no preceding vehicle is detected, a constant-speed traveling is performed at a vehicle speed set by the driver. In addition, when the preceding vehicle is stopped, the host vehicle is also stopped while maintaining a suitable inter-vehicle distance. In the case where the preceding vehicle is resumed to travel, on the one hand, an inter-vehicle distance corresponding to the vehicle speed is maintained, and on the other hand, the following travelling begins.

In addition, various operation conditions and/or alarm messages of the inter-vehicle distance control function, the vehicle stop maintenance function, and the idle-stop function are displayed on a dashboard 30, and a warning light is turned on. In addition to the dashboard 30, alarm messages and alarm sound can also be output from a speaker.

Figure 4B:
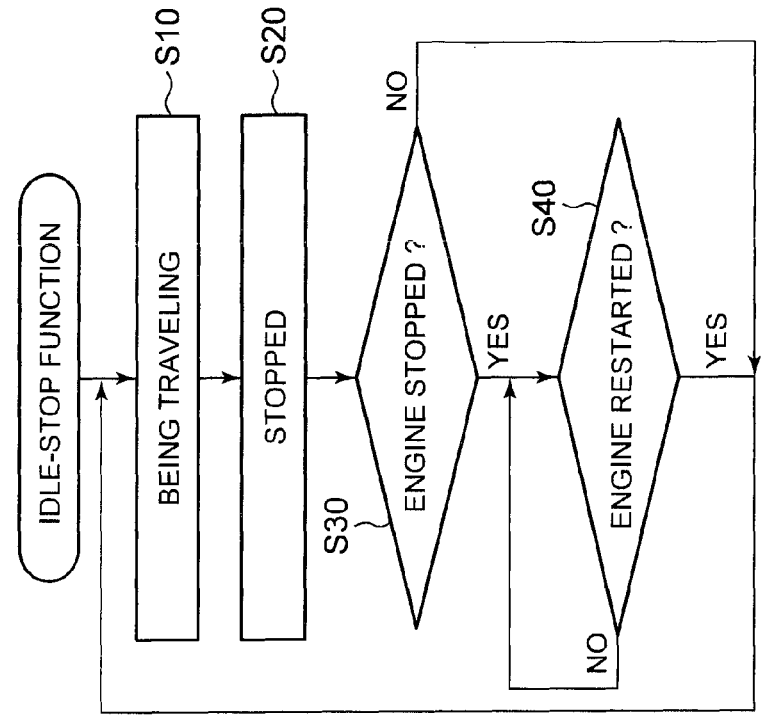
FIG. 4B is an exemplary flowchart for explaining the operation procedure of the idle-stop control in the case where the inter-vehicle distance control function is turned off and the vehicle speed is controlled by the driver.
Figure 4A:
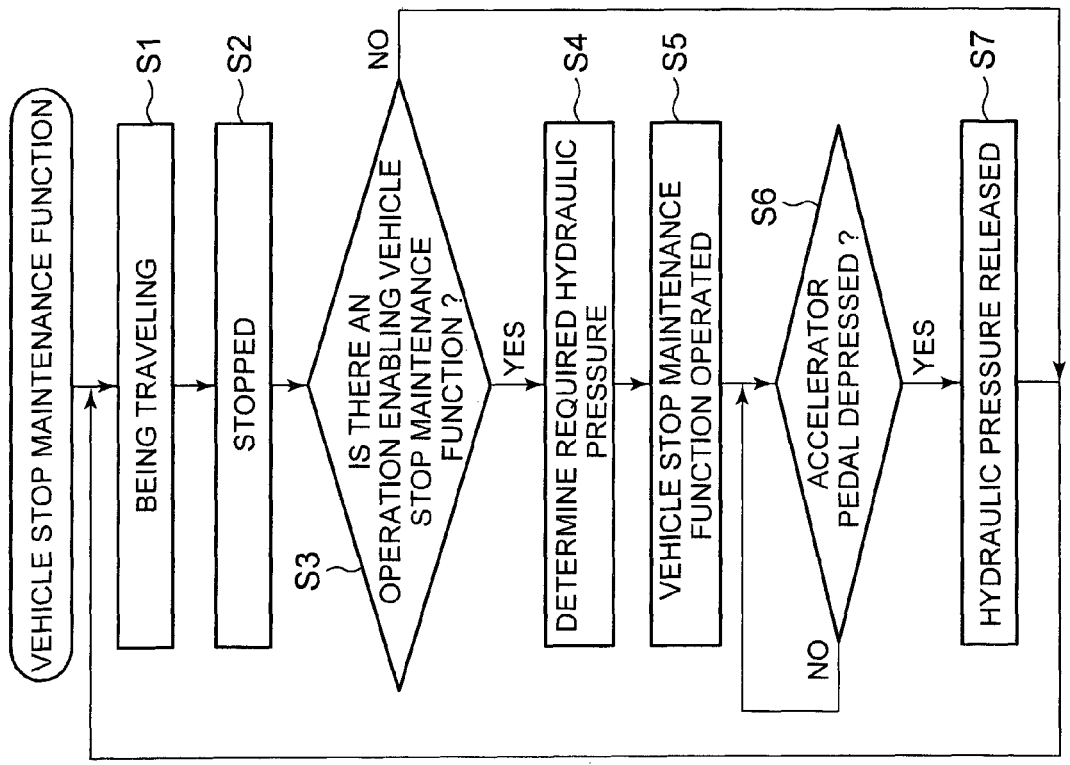
FIG. 4A is an exemplary flowchart for explaining the operation procedure of the idle-stop control in the case where the inter-vehicle distance control function is turned off and the vehicle speed is controlled by the driver.

(Regarding the vehicle stop maintenance control, the idle-stop control) FIG. 4A is an exemplary flowchart showing the schematic operation procedure of only the vehicle stop maintenance function, that is, an illustration of operations in a state where both the inter-vehicle distance control function and the idle-stop function are not operated.

The engine 20 of the vehicle has been started, and the vehicle becomes a vehicle being traveling (S1).

Next, the driver operates the brake pedal to stop the vehicle (S2).

Next, The brake ECU 24 determines whether or not an operation enabling the vehicle stop maintenance function is performed (S3). The operation enabling the vehicle stop maintenance function is, for example, the operation that the driver depresses the brake pedal at a depression force larger than a threshold value. Besides, it can also be an operation of pressing a predetermined press button. The brake ECU 24 detects the value of the master cylinder pressure and/or the value of stroke of the brake pedal to determine whether or not there is an operation enabling the vehicle stop maintenance function.

In the case where an operation enabling the vehicle stop maintenance function is detected (YES in S3), the brake ECU 24 determines the wheel cylinder pressure (S4). The vehicle is stopped at D position and the engine 20 is in the idle state. Therefore, the wheel cylinder pressure for maintaining the vehicle stop state is the hydraulic pressure of a required minimum braking force which is larger than the driving force in the idle state. The wheel cylinder pressure is dependent on performance of the brake, the vehicle weight, or the like. In addition, the pressure is corrected according to the inclination angle of the road surface. The brake ECU 24 controls the brake ACT 37 in such a manner that the wheel cylinder pressure becomes the determined wheel cylinder pressure, so as to enable the vehicle stop maintenance function (S5). That is, the brake ECU 24 uses the wheel cylinder pressure obtained by depressing of the brake pedal by the driver at vehicle stop, and maintains it to be the wheel cylinder pressure determined for achieving the vehicle stop maintenance function. In the case where the wheel cylinder pressure generated by depressing of the brake pedal is smaller than the determined wheel cylinder pressure, since the braking force for stopping the vehicle is obtained, the wheel cylinder pressure is maintained. Such a function of the brake ECU 24 is the vehicle stop maintenance function. Since the driver can move his foot away from the brake pedal while the operation state of the engine is kept unchanged, the degree of freedom of the driver's posture is improved during a short-time vehicle stop or the like.

If the vehicle stop maintenance function is operated, the brake ECU 24 determines whether or not the accelerator pedal is operated (depressed) (S6).

In the case where the accelerator pedal is operated (YES in S6), the brake ECU 24 releases the wheel cylinder pressure. Thus, the vehicle can quickly resume traveling.

FIG. 4B is an exemplary flowchart showing the schematic operation procedure of only the idle-stop function, that is, an illustration of operations in a state where both the inter-vehicle distance control function and the vehicle stop maintenance function are not operated.

The engine 20 of the vehicle has been started and the vehicle is traveling (S10).

The driver operates the brake pedal to stop the vehicle (S20). In addition, the vehicle stop by the idle-stop function generally means the vehicle speed becomes zero. However, even if the vehicle speed is above zero, there is the idle-stop function, for stopping the engine 20 as long as the vehicle speed is at or below a predetermined value. In the present embodiment, for the purpose of illustration, the vehicle stop is determined when the vehicle speed becomes zero.

Next, the energy saving traveling ECU 28 determines whether or not the engine 20 is to be stopped based on an engine stop condition (S30). The stop condition varies among vehicles, but may be, for example, such a condition that the vehicle speed is zero and such a condition that the brake pedal is depressed. In addition, as a stop disabling condition, there are such a condition that the air conditioner ECU prohibits the engine being stopped, such a condition that the SOC of the battery 15 is at or below a threshold, such a condition that power consuming load is at or above a threshold, such a condition that the temperature of engine water is at or below a threshold, and such a condition that the accelerator pedal is depressed, and so on.

In the case where the stop condition is not satisfied or the stop disabling condition is satisfied (NO in S30), the energy saving traveling ECU does not request the engine ECU 26 to stop the engine, thus the engine 20 is not stopped.

In the case where the stop condition is satisfied (YES in S30), the energy saving traveling ECU requests the engine ECU 26 to stop the engine, and the engine ECU 26 will stop the injection of fuel so as to stop the engine 20.

When the engine 20 has been stopped, the energy saving ECU 28 determines whether or not the engine 20 is to be restarted based on a restart condition (S40). The restart condition also varies among vehicles, but for, example may be one or more conditions as listed below, that is, a situation where it is detected that the brake pedal is released from being depressed, a situation where the accelerator pedal is depressed and the SOC of the battery 15 is lowered to a predetermined threshold or below, a situation where the negative pressure of the brake booster becomes a, threshold or above. In addition, as a start disabling condition under which the engine 20 will not be restarted even though the above restart conditions are satisfied, there is a situation where the engine hood lock SW12 is OFF.

In the case where the restart condition is satisfied and the start disabling condition is not satisfied, the energy saving traveling ECU 28 determines that the engine 20 is to be restarted. When it is determined that the engine 20 is to be restarted, since the energy saving traveling ECU 28 requests the engine ECU 26 to restart the engine, the engine ECU 26 turns on the series-connected starter driving relay 21 to restart the engine 20.

In this way, the driver can stop the engine 20 simply by stopping the vehicle, whereby it is possible to reduce the fuel consumption in the idle state and improve the fuel economy.

Figure 5:
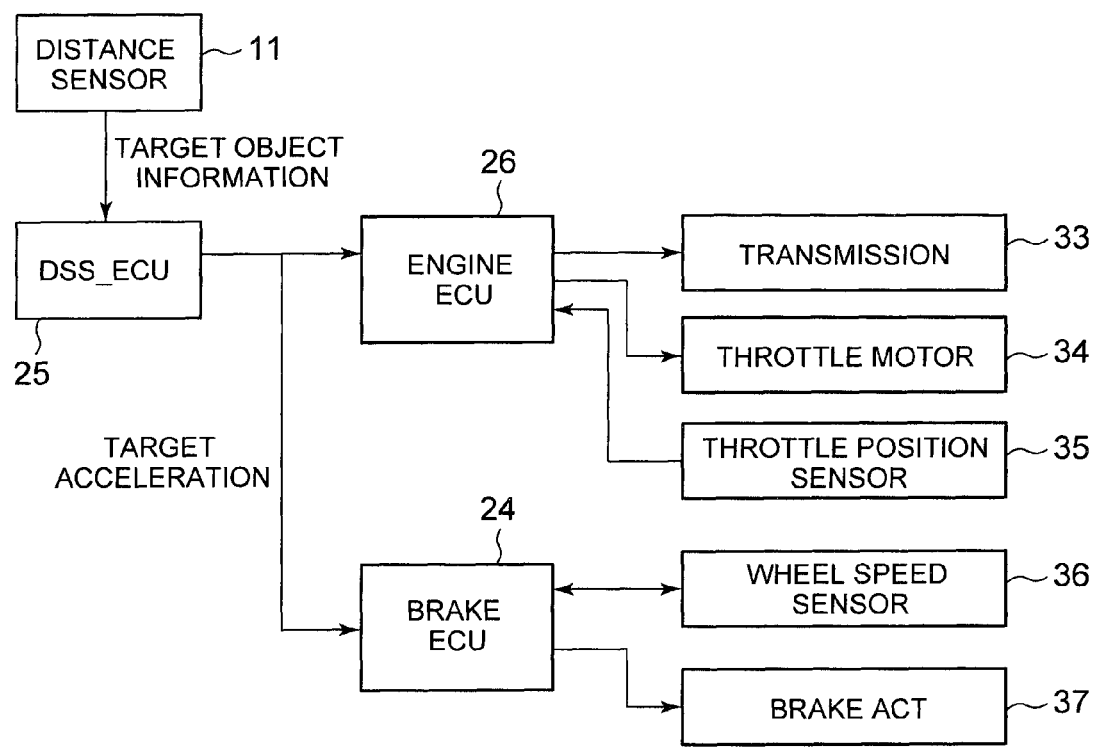
FIG. 5 is an exemplary block diagram of the inter-vehicle distance control function in the control apparatus for a vehicle.

(Inter-vehicle distance control function) FIG. 5 is an exemplary block diagram showing the inter-vehicle distance control function in the control apparatus 100 for a vehicle. The inter-vehicle distance control function is performed by the DSS_ECU 25 in cooperation with the distance sensor 11, the engine ECU 26, the brake ECU 24, and so on. Each of the ECUs is an information processing apparatus equipped with a microcomputer, a power supply, and interfaces for wirings, etc. The microcomputer has a well-known structure including a CPU, a ROM, a RAM, a non-volatile memory, an I/O and CAN communication devices, and the like.

The distance sensor 11 outputs the target object information (relative distance, relative speed, and orientation) of the object to the DSS_ECU 25 periodically.

The DSS_ECU 25 calculates a target acceleration (required driving force) based on the target object information and the current vehicle speed and acceleration of the host vehicle detected by a wheel speed sensor 36, and outputs the target acceleration to the engine ECU 26 and/or the brake ECU 24. The target acceleration is a positive value or a negative value. If the target acceleration is a positive value, the engine ECU 26 performs an accelerating control, and if the target acceleration is a negative value and is a target acceleration that requires braking, the brake ECU 24 controls the brake ACT (brake) 37 to decelerate.

Since the calculation methods of the target acceleration are well-known, a description thereof will be omitted. However, the target acceleration may be determined by taking into account, for example, the difference between a target inter-vehicle distance and the current inter-vehicle distance as determined by the speed, and the relative speed.

The engine ECU 26 determines the opening degree of the throttle based on the target acceleration, and controls the throttle Motor 34 while monitoring the opening degree of the throttle detected by a throttle position sensor 35. In addition, based on shift-up lines and shift-down lines set with respect to the vehicle speed and the opening degree of the throttle, the engine ECU 26 determines whether or not it is necessary to switch the shift range, and if yes, indicates the shift range to the transmission 33. The transmission 33 may be a mechanism of any configurations, such as an AT (automatic transmission), or a CVT (Continuously Variable Transmission).

The brake ECU 24 controls the ON/OFF as well as the opening degree of a valve of the brake ACT 37 according to the target acceleration (negative value), so as to control the wheel cylinder pressure. The brake ACT 37 increases, maintains, or reduces the wheel cylinder pressure of the respective wheels by using the hydraulic pressure generated by the working fluid with a pump, so that deceleration of the vehicle can be controlled.

In addition, in the case where the inter-vehicle distance control function is operated and the brake ECU 24 makes the vehicle stop, considering there is a possibility that the vehicle is not stopped, the inter-vehicle distance control function increases the wheel cylinder pressure to fully stop the vehicle. Such braking is called "braking for confirming vehicle stop". In the case where the vehicle is stopped by the inter-vehicle distance control function, assuming that the driver does not operate the brake pedal, the condition that enables the vehicle stop maintenance function is the braking for confirming vehicle stop, instead of the depressing of the brake pedal.

Figure 6:
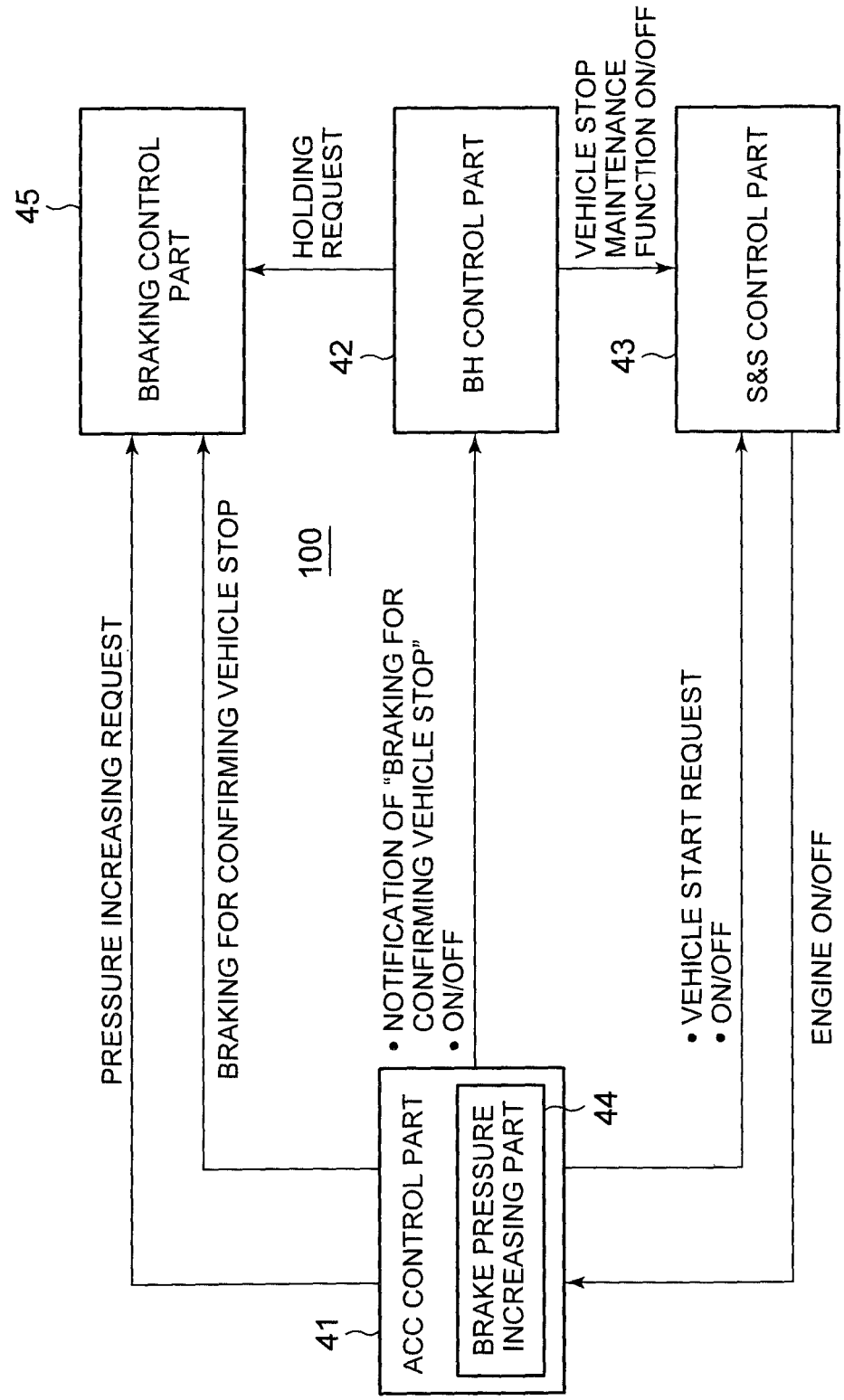
FIG. 6 is an exemplary functional block diagram of the control apparatus for a vehicle.

(Functional block diagram) FIG. 6 shows an exemplary functional block diagram of the control apparatus 100 for a vehicle. The CPUs of the ECUs execute programs stored in the ROMs and cooperate with various hardware so as to achieve these functions.

As described hitherto, the control apparatus 100 for a vehicle according to the present embodiment includes an ACC control part 41 for controlling the inter-vehicle distance control function, a BH control part 42 for controlling the vehicle stop maintenance function, an S&S control part 43 for controlling the idle-stop function, and a braking control part 45 for controlling the brake ACT. In addition, the ACC control part 41 additionally has a brake pressure increasing part 44. The brake pressure increasing part 44 may be included in the ACC control part 41 as shown, or may be separate from the ACC control part 41, the BH control part 42 and the S&S control part 43. In addition, the brake pressure increasing part 44 may be included in either of the BH control part 42 or the S&S control part 43.

The ACC control part 41 notifies the BH control part 42 and the S&S control part 43 of whether or not it is in operation (ON/OFF). In addition, the ACC control part 41 requests "the braking for confirming vehicle stop" of the braking control part 45, and notifies the BH control part 42 of the situation that the braking for confirming vehicle stop has been performed. In addition, the ACC control part 41 detects the start of the preceding vehicle, and informs the S&S control part 43 of a start request.

If the BH control part 42 acquires the notification of "the braking for confirming vehicle stop", it requests the braking control part 45 to keep the braking for performing vehicle stop maintenance as described in the step S4 of FIG. 4A.

Moreover, besides the braking force for performing the vehicle stop maintenance by the BH control part 42, the brake pressure increasing part 44 also requests the braking control part 45 to increase the wheel cylinder pressure, so that the vehicle would not move when the engine 20 is restarted by the idle-stop control. Alternatively, the brake pressure increasing part 44 may also request the braking control part 45 to generate a braking force which is a sum of the wheel cylinder pressure corresponding to the vehicle stop maintenance amount and the amount of pressure increase that makes the vehicle not move when the engine 20 is restarted by the idle-stop function, in place of the wheel cylinder pressure corresponding to the vehicle stop maintenance amount by the BH control part 42. That is, the pressure increasing may be done either in a stepwise manner or at once.

The wheel cylinder pressure corresponding to the amount of pressure increase that makes the vehicle not move when the engine 20 is restarted by the idle-stop function is calculated as follows.

Equation 1

$$P[N] = \frac{\text{capacity coefficient of torque converter} * \text{torque ratio of torque converter} * 1st \text{ gear ratio} * \text{differential ratio}/\text{diameter of tire} * (\text{speed-up MAX rotation speed}^\wedge 2 - \text{idle rotation speed MIN}^\wedge 2)}{} \tag{1}$$

hydraulic pressure corresponding to amount of brake pressure increase(amount of increase of wheel cylinder pressure)[MPa] =

$$\frac{P/\text{area of caliper piston}[mm^\wedge 2]/BEF[\text{dimensionless}]}{\text{effective radius of caliper braking}[mm] * \text{dynamic load radius of tire}[mm]}$$

The speed-up rotation speed and the idle rotation speed are not necessarily constant when the engine is started. Therefore, by setting the speed-up MAX rotation speed, the estimated maximum speed-up rotation speed is predetermined. In addition, by setting the idle rotation speed MIN, the estimated minimum idle rotation speed is predetermined. That is, in the vehicle stop maintenance function, since the wheel cylinder pressure for vehicle stop maintenance is determined with a margin, the wheel cylinder pressure for braking a vehicle which has an engine rotation speed with a larger driving force than that of the idle rotation speed MIN can be obtained. Therefore, as indicated by the above equation, the wheel cylinder pressure corresponding to the amount of pressure increase is determined according to the speed-up MAX rotation speed and the idle rotation speed MIN, so as to obtain the braking force for maintaining the stop state when the engine is speeded up. Thus, the wheel cylinder pressure can be increased to such an extent that the vehicle would not move when the engine 20 is restarted by the idle-stop function, regardless of the actual speed-up rotation speed and idle rotation speed.

In addition, the wheel cylinder pressure corresponding to an amount of pressure increase that makes the vehicle not move can be dynamically calculated. For example, the speed-up rotation speed is monitored, and an average of the previous multiple speed-up rotation speeds is calculated. In addition, the engine rotation speed immediately before the engine is stopped is detected as the idle rotation speed. Then, the wheel cylinder pressure corresponding to the amount of pressure increase is dynamically calculated according to these values based on the Equation (1).

In addition, the BH control part 42 and the S&S control part 43 operate simultaneously with the ACC control part 41, whereby the operations are changed relative to the conventional ones. Firstly, the BH control part 42 requests the braking control part 45 to maintain the wheel cylinder pressure for the vehicle stop maintenance in same way as the conventional case. However, the operation enabling the vehicle stop maintenance function is switched from the operation that the driver depresses the brake pedal with a depression force at or above a threshold to the notification of "the braking for confirming vehicle stop" from the ACC control part 41. Thus, the vehicle stop maintenance control can also, be performed when the inter-vehicle distance control function is operated. In addition to this, the BH control part 42 may also be configured to determine that the ACC control part 41 has performed the braking for confirming vehicle stop by the conditions that the inter-vehicle distance control function is in operation, the vehicle speed is zero, and the master cylinder pressure and/or the wheel cylinder pressure is at or above a predetermined value, instead of the notification of "the braking for confirming vehicle stop". The BH control part 42 notifies the S&S control part of the ON (operated)/OFF (cancelled) of the vehicle stop maintenance function.

In addition, the S&S control part 43 notifies the brake pressure increasing part 44 of the ON/OFF of the engine. In addition, the S&S control part 43 and the ACC control part 41 operate at the same time, whereby the engine stop condition and the engine restart condition are changed. Firstly, instead of such a condition that the vehicle speed is zero and such a condition that the brake pedal is depressed, the stop condition is changed to such a condition that the vehicle speed is zero and such a condition that the vehicle stop maintenance function is in operated. In the case where it is designed that the inter-vehicle distance control function is cancelled when the brake pedal is depressed, the inter-vehicle distance control function is cancelled by depressing the brake pedal. In addition, it is assumed that there is a situation where the brake pedal is not depressed when the inter-vehicle distance control function is operated. Therefore, in the case where the inter-vehicle distance control function is operated, the S&S control part 43 does not take "the situation where the brake pedal is depressed" as the engine stop condition. Moreover, the operation enabling the vehicle stop maintenance function is switched from the operation that the brake pedal is depressed to the notification of "the braking for confirming vehicle stop". Therefore, when the inter-vehicle distance control function is operated, it is reasonable to use "the vehicle stop maintenance function being operated" as the engine stop condition.

In addition, when the inter-vehicle distance control function is operated, since the host vehicle is also started following the start of the preceding vehicle, even if the driver does not operate the accelerator pedal, the S&S control part 43 needs to start the engine 20. Therefore, the restart condition is changed as follows: such a condition that the preceding vehicle is started, the situation where the accelerator pedal is depressed, the situation where the SOC of the battery 15 is lowered to a threshold or below, and the situation where the negative pressure of the brake booster is at or above a threshold. In addition, the braking control part 45 acquires a holding request from the BH control part to control the brake ACT 37 with the wheel cylinder pressure for performing vehicle stop maintenance as described in the step S4 of FIG. 4A, so that the vehicle is maintained in stop state. In addition, when the braking control part 45 has acquired the pressure increasing request from the brake pressure increasing part, it, maintains the braking force after the pressure increase by controlling the brake ACT 37 if it acquires the holding request from the BH control part.

Figure 7:
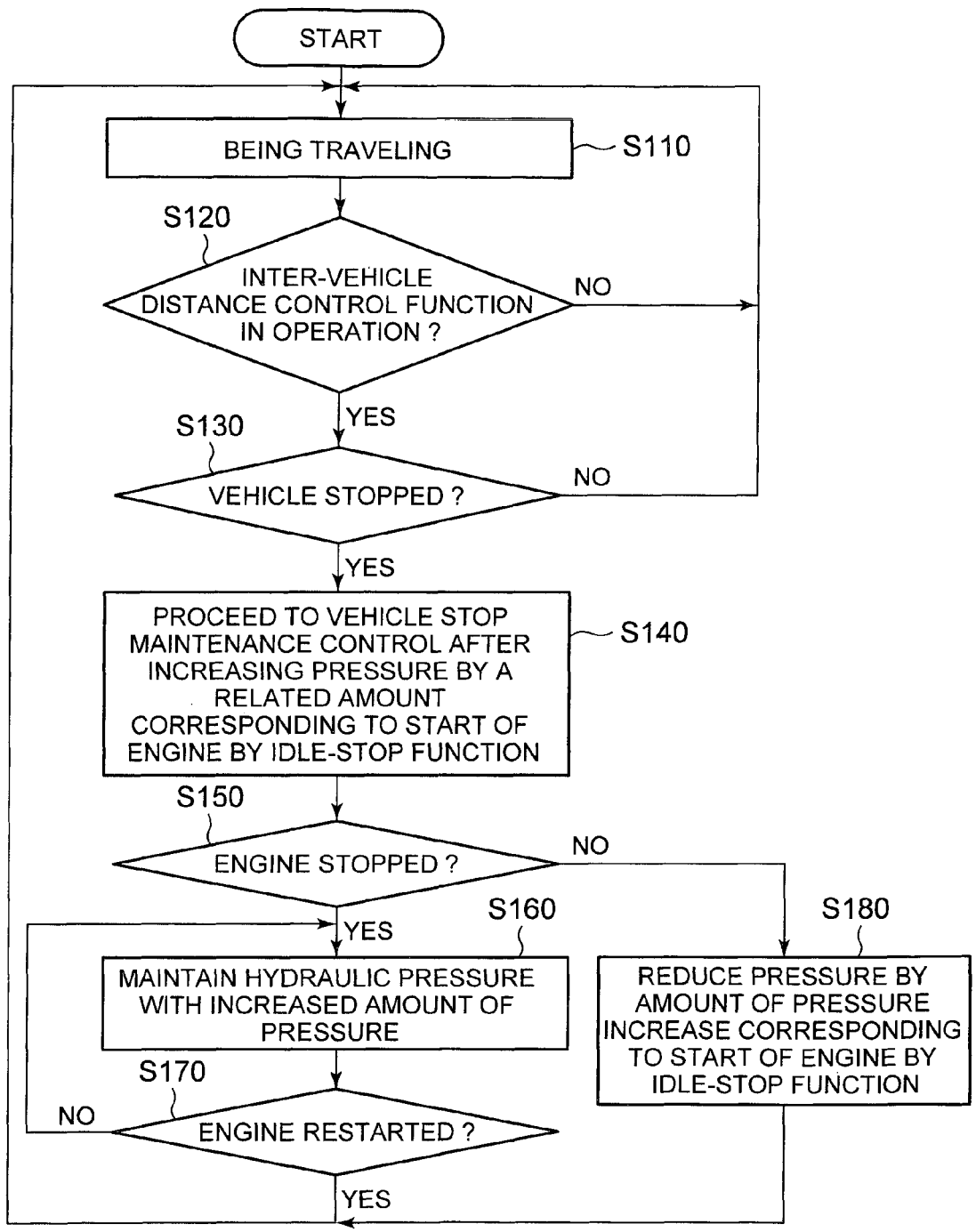
FIG. 7 is an exemplary diagram for explaining the operation procedure of the control apparatus for a vehicle.
Figure 9A:
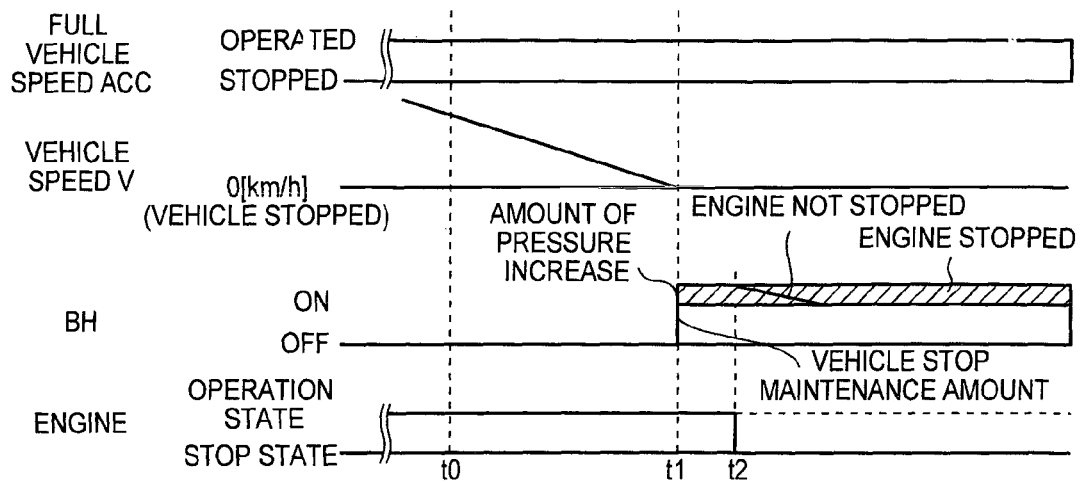
FIG. 9A is an exemplary sequential diagram showing the schematic operation procedure of the control apparatus for a vehicle.

(Operation procedure) FIG. 7 is an exemplary diagram for explaining the operation procedure of the control apparatus 100 for a vehicle according to the present embodiment. In addition, FIG. 9A is an exemplary sequential diagram showing the operation procedure of the control apparatus for a vehicle according to the present embodiment.

Firstly, description will be made with reference to the flowchart. The engine 20 of the vehicle has been started, and the vehicle becomes a traveling vehicle (S110).

In the present embodiment, the situation where the inter-vehicle distance control function is in operation is a premise, so it is determined whether or not the inter-vehicle distance control function is in operation (120). In addition, the determination in the step S120 may be performed directly before or after the determination as to "whether or not the vehicle is stopped" in the step S130.

In the case where the vehicle speed can be regarded as zero and thus it is determined that the vehicle is stopped during the operation of the inter-vehicle distance control function (YES in S130), the ACC control part 41 performs the braking for confirming vehicle stop, such that the BH control part 42 can output to the braking control part 45 the holding request of the wheel cylinder pressure for vehicle stop maintenance. Thus, the brake pressure increasing part 44 outputs to the braking control part 45 a pressure increasing request of an amount of pressure increase corresponding to the driving force at the start of the engine (S140). That is, the braking control part 45 can perform pressure increasing with respect to the braking for vehicle stop maintenance and the braking corresponding to the driving force at the start of the engine simultaneously, rather than separately. Since the BH control part 42 outputs to the braking control part 45 a holding request of the wheel cylinder pressure for vehicle stop maintenance, the braking control part 45, according to the holding request from the BH control part 42, maintains a wheel cylinder pressure which is a sum of the wheel cylinder pressure for vehicle stop maintenance and the wheel cylinder pressure corresponding to the driving force at the start of the engine.

Next, the S&S control part 43 determines whether or not the engine 20 is to be stopped based on the stop condition and the stop disabling condition (S150). The stop condition when the inter-vehicle distance control function is operated has been described as above.

In the case where the engine 20 is not to be stopped (NO in S150), since a pressure increase corresponding to the driving force at the start of the engine by the idle-stop function is not needed, the brake pressure increasing part 44 requests the braking control part 45 to reduce the pressure by an amount corresponding to the driving force at the start of the engine by the idle-stop control (S180). Furthermore, the pressure reduction can also be performed by the BH control part 42 or the S&S control part. The braking control part 45 reduces the pressure by only the amount of pressure increase corresponding to the driving force at the start of the engine. By the pressure reduction, it is not necessary to maintain a high hydraulic pressure, and the fuel economy is improved. In addition, it is possible to restrain a high load being applied to the hydraulic circuit and the like for a long time.

In the case where the engine 20 has been stopped (YES in S150), the BH control part 42 continues to maintain almost constant the wheel cylinder pressure for vehicle stop maintenance and the pressure increase corresponding to the driving force at the start of the engine.

If the engine 20 is stopped, the energy saving traveling ECU 28 determines whether or not the engine 20 is to be restarted based on the restart condition during operation of the inter-vehicle distance control function (S170). If the engine 20 is determined to be restarted (YES in S170), the energy saving traveling ECU 28 restarts the engine 20.

Description will be made based on FIG. 9A. Time t0: the vehicle is performing a traveling following the preceding vehicle in a state where the inter-vehicle distance control function is operated. Time t1: the vehicle is stopped, the ACC control part 41 performs the braking for confirming vehicle stop, and the brake pressure increasing part 44 performs the pressure increasing request. The braking control part 45, according to the holding request from the BH control part 42, performs hold of the wheel cylinder pressure for vehicle stop maintenance and pressure increasing corresponding to the driving force at the start of the engine, simultaneously. Time t2: the S&S control part 43 determines whether or not the engine is to be stopped, and in the case of non-stop, the braking control part 45, according to the request from the brake pressure increasing part, reduces the pressure by an amount of pressure increase corresponding to the driving force at the start of the engine.

As described above, even if the engine 20 is restarted to generate a driving force by the speed-up at the start of the engine, the vehicle can be prevented from moving. In addition, since the pressure is increased corresponding to the driving force at the start of the engine before the engine is stopped, a braking force required by the speed-up amount at the start of the engine can be reliably ensured.

Modified Example

Figure 8:
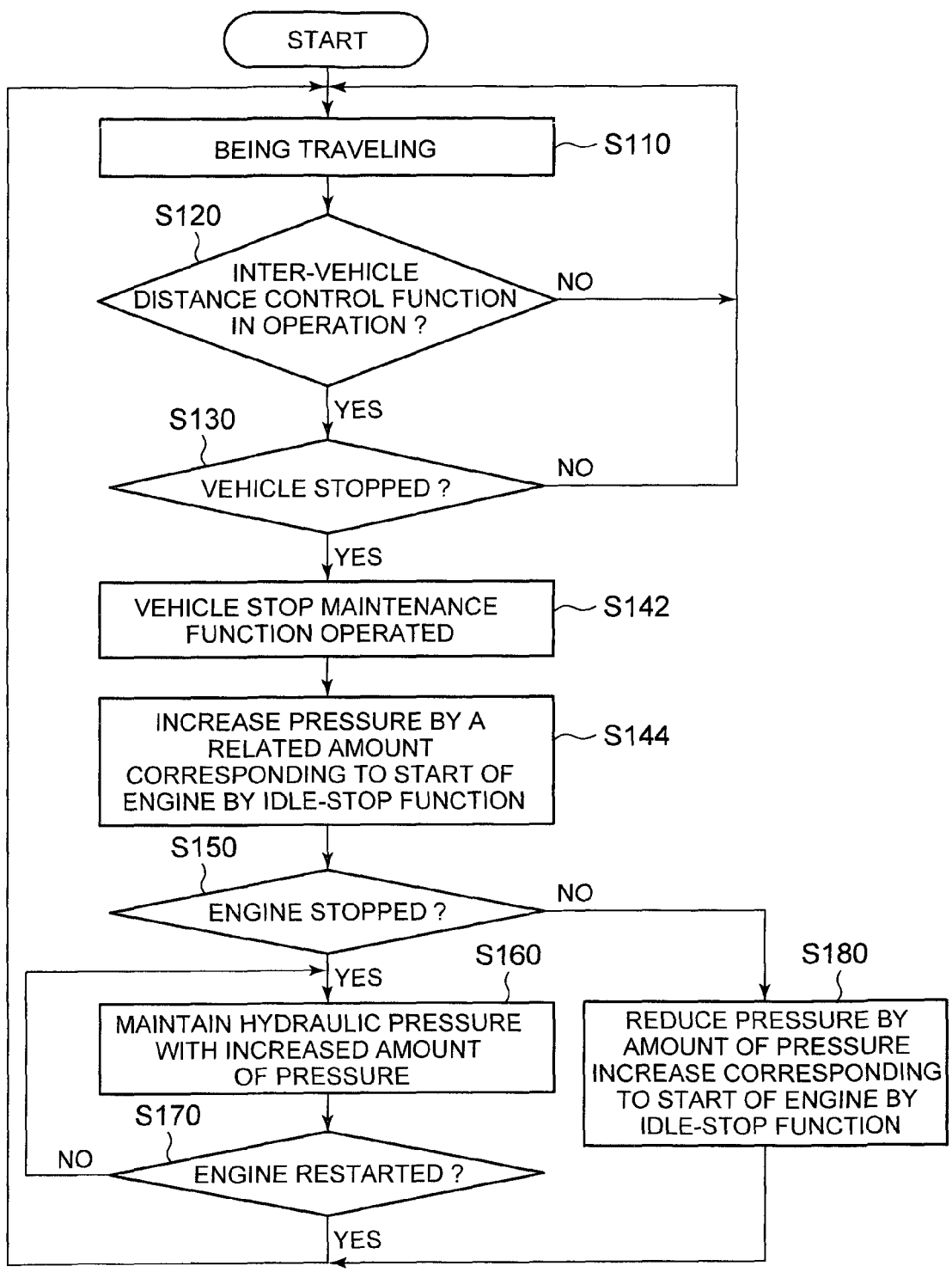
FIG. 8 is an exemplary diagram for explaining a modified example of the operation procedure of the control apparatus for a vehicle in FIG. 7.
Figure 9B:
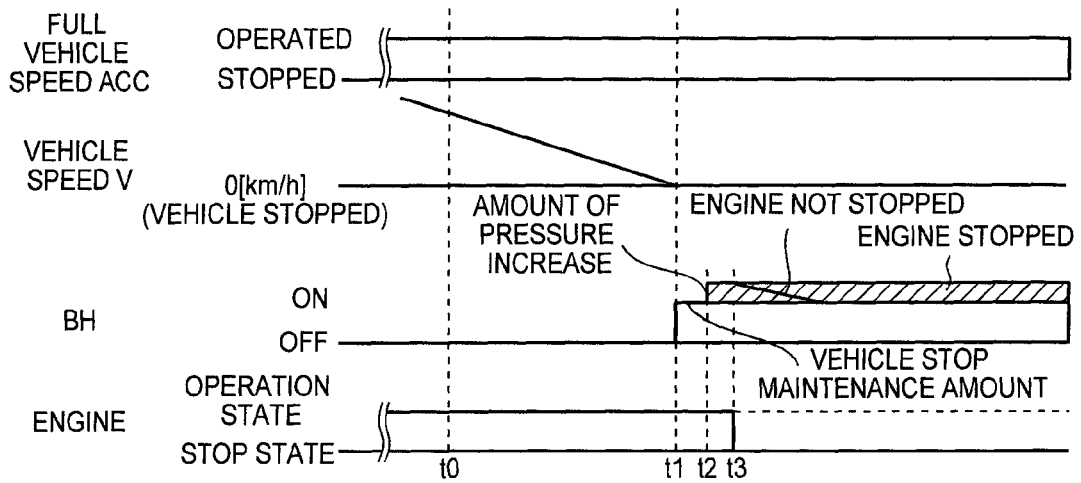
FIG. 9B is an exemplary sequential diagram showing the schematic operation procedure of the control apparatus for a vehicle.

FIG. 8 is an exemplary diagram for explaining a modified example of the operation procedure of the control apparatus 100 for a vehicle in FIG. 7. In addition, FIG. 9B is an exemplary sequential diagram showing the operation procedure of the control apparatus for a vehicle according to the present modified example.

A difference from the procedure of FIG. 7 is that the process of S140 in FIG. 7 is divided into the operation of the vehicle stop maintenance function in S142 and the process of pressure increasing at the start of the engine by the idle-stop function in S144.

In S130, in the case where the vehicle has been stopped by the ACC control part 41 (YES in S130), the BH control part 42 acquires the notification of the braking for confirming vehicle stop from the ACC control part 41, and outputs the holding request to the braking control part 45 (S142).

Next, the brake pressure increasing part 44 outputs to the braking control part 45 the pressure increasing request of an amount of pressure increase corresponding to the driving force at the start of the engine (S144). Since the braking control part 45 has acquired the holding request, the wheel cylinder pressure that has been added with a braking force corresponding to the driving force at the start of the engine is maintained. It can be said that such a procedure is a theoretical one faithful to the functional block diagram.

Thus, in the procedure of FIG. 8, like FIG. 7, even if the engine 20 is restarted to generate a driving force by the speed-up at the start of the engine, the vehicle can be prevented from moving.

Description will be given according to FIG. 9B. FIG. 9B is a diagram for explaining FIG. 2A in detail. Time t0: the vehicle is performing a traveling following the preceding vehicle in a state where the inter-vehicle distance control function is operated. Time t1: the vehicle is stopped; and the ACC control part 41 performs the braking for confirming vehicle stop, such that the BH control part 42 outputs the holding request to the braking control part 45. The braking control part 45 performs hold of the wheel cylinder pressure for vehicle stop maintenance. Time t2: the brake pressure increasing part 44 outputs to the braking control part 45 a pressure increasing request of an amount of pressure increase corresponding to the driving force at the start of the engine. The braking control part 45 increases the wheel cylinder pressure, and maintains the increased wheel cylinder pressure. Time t3: the S&S control part 43 determines whether or not the engine is to be stopped, and in the case of non-stop, the braking control part 45, according to the request from the brake pressure increasing part, reduces the pressure by an amount of pressure increase corresponding to the driving force at the start of the engine.

As described above, with the control apparatus for a vehicle according to the present embodiment, even in the case where the engine is stopped by the idle-stop function, it is possible to prevent the vehicle from moving when the engine is restarted by the idle-stop function, by increasing the wheel cylinder pressure.

In Embodiment 1, the pressure increasing corresponding to the driving force at start of the engine is done before the engine is stopped. However, in the present embodiment, the control apparatus 100 for a vehicle in which the pressure increasing corresponding to the driving force at the start of the engine is performed after the engine is stopped will be described.

In addition, as to the structural diagram and the functional block diagram, as they perform the same functions as in Embodiment 1, sometimes only the main components of the present embodiment will be mainly described.

Figure 9C:
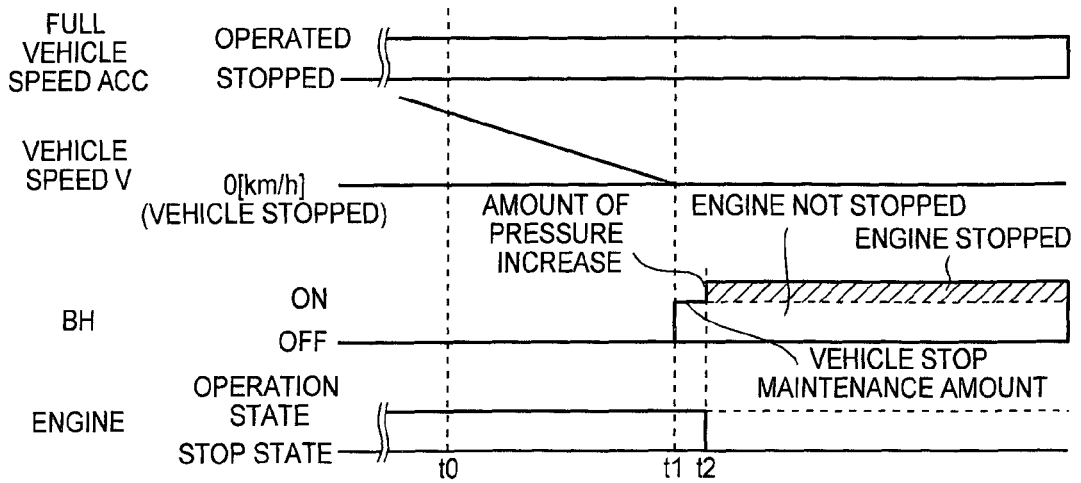
FIG. 9C is an exemplary sequential diagram showing the schematic operation procedure of the control apparatus for a vehicle.
Figure 10:
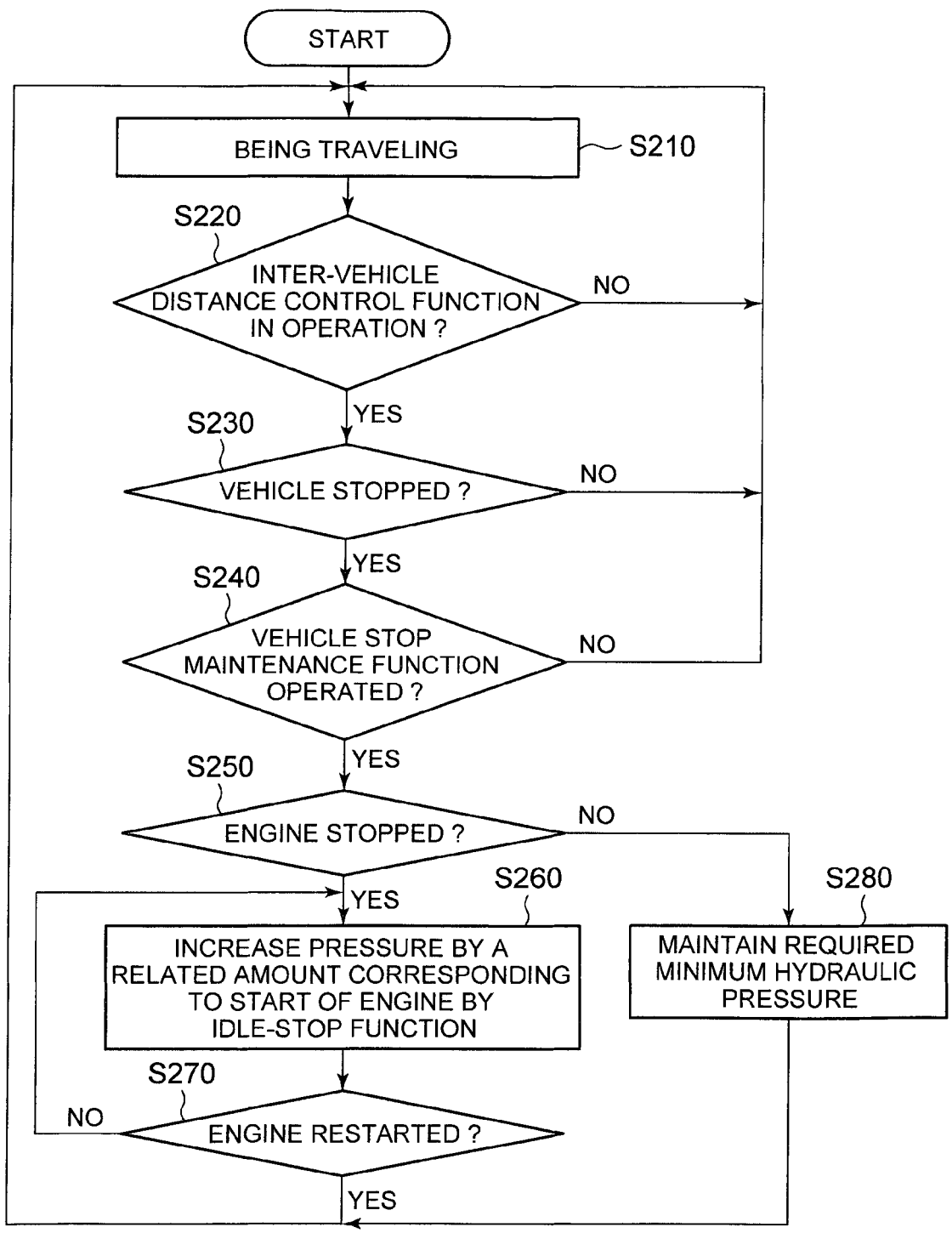
FIG. 10 is an exemplary diagram for explaining the operation procedure of the control apparatus for a vehicle (Embodiment 2)

FIG. 10 is an exemplary diagram for explaining the operation procedure of the control apparatus 100 for a vehicle according to the present embodiment. In addition, FIG. 9C is an exemplary sequential diagram showing the operation procedure of the control apparatus for a vehicle according to the present embodiment.

The engine 20 of the vehicle has been started, and the vehicle becomes a traveling vehicle (S210).

In the present embodiment, the situation where the inter-vehicle distance control function is in operation is a premise, so it is determined whether or not the inter-vehicle distance control function is in operation (220). The determination in the step S220 may be performed directly before or after the determination as to "whether or not the vehicle is stopped" in the step S230.

In the case where the vehicle is stopped during operation of the inter-vehicle distance control function (YES in S230), the BH control part 42 detects whether or not the ACC control part 41 has performed the braking for confirming vehicle stop and outputs the holding request to the braking control part 45 (S240). Thus, the braking control part 45 maintains the wheel cylinder pressure for vehicle stop maintenance.

Next, the S&S control part 43 determines whether or not the engine 20 is to be stopped based on the stop condition and the stop disabling condition (S250).

In the case where the engine 20 is not to be stopped (NO in S250), since a pressure increase corresponding to the driving force at the start of the engine by the idle-stop function is not needed, the braking control part 45 maintains the wheel cylinder pressure for vehicle stop maintenance as it is (S280). Therefore, unlike Embodiment 1, if the engine 20 is not stopped, no excessive amount of pressure increase is applied.

In the case where the engine 20 is stopped (YES in S250), the brake pressure increasing part 44 outputs to the braking control part 45 a pressure increasing request of an amount of pressure increase corresponding to the driving force at the start of the engine by the S&S control part 43 (S260). The braking control part 45 increases the pressure by the amount of pressure increase and maintains it almost constant.

If the engine 20 is stopped, the energy saving traveling ECU 28 determines whether or not the engine 20 is to be restarted based on the restart condition during the operation of the inter-vehicle distance control function (S270).

Description will be given based on FIG. 9C. Time t0: the vehicle performs a traveling following the preceding vehicle in a state where the inter-vehicle distance control function is operated. Time t1: the vehicle is stopped, and the ACC control part 41 performs the braking for confirming vehicle stop, such that the BH control part 42 outputs a holding request to the braking control part 45. The braking control part 45 performs hold of the wheel cylinder pressure for vehicle stop maintenance. Time t2: the S&S control part 43 determines whether or not the engine is to be stopped. In the case of stop, the brake pressure increasing part 44 outputs to the braking control part 45 a pressure increasing request of an amount of pressure increase corresponding to the driving force at the start of the engine. The braking control part 45 increases the wheel cylinder pressure, and maintains the increased wheel cylinder pressure.

Therefore, even if the engine 20 is restarted to generate a driving force by the speed-up at the start of the engine, the vehicle can be prevented from moving. In addition, in the present embodiment, unnecessary pressure increasing is not needed.

In the present embodiment, description will be made with respect to the following control apparatus 100 for a vehicle: it is determined whether or not it is necessary to increase the wheel cylinder pressure corresponding to the driving force at the start of the engine by the S&S control part 43, based on which factor of the engine restart condition by the S&S control part 43 is satisfied.

In the case where the S&S control part 43 stops the engine 20, as a restart condition, there are the situation where the S&S control part 43 detects a start, request (the situation where the preceding vehicle is started, the situation where the accelerator pedal is depressed) so as to restart the engine 20, and other situations to restart the engine 20 than the above (the situation where the SOC of the battery 15 is lowered to a threshold or below, the situation where the negative pressure of the brake booster is at or above a threshold).

In the case where a vehicle start request is detected, the movement of the vehicle can make a good responsiveness from the start of the engine up to the start of the vehicle. Therefore, in the case where the vehicle start request is detected, it is sometimes not necessary to increase the wheel cylinder pressure corresponding to the driving force at the start of the engine by the idle-stop function.

Therefore, in the present embodiment, the control apparatus 100 for a vehicle determines which factor of the restart condition of the engine 20 is satisfied, and thus does not increase the wheel cylinder pressure corresponding to the driving force at the start of the engine by the idle-stop function, or reduces the pressure after the pressure increasing.

FIG. 11 is an exemplary diagram for explaining the operation procedure of the control apparatus 100 for a vehicle according to the present embodiment. The procedure in FIG. 11 is almost same as that in FIG. 7 of Embodiment 1, and the difference lies in that after the amount of pressure increase is maintained in the step S160, the brake pressure increasing part 44 determines whether or not "there is not the possibility that other restart conditions than the vehicle start request are satisfied" (S162).

That is, it is determined whether or not there is a possibility that the SOC of the battery 15 is lowered to a threshold or below, or whether or not there is a possibility that the negative pressure of the brake booster is at or above a threshold. For example, if the SOC of the battery 15 is sufficiently high as compared with the threshold, it is determined that there is not the possibility that the SOC will be lowered to the threshold or below during the vehicle stop. In addition, if the negative pressure of the brake booster is sufficiently low, it is determined that there is no possibility that the negative pressure of the brake booster becomes the threshold or above during the vehicle stop.

In these situations, it will suffice to consider the case where the restart condition of the engine 20 is satisfied by detecting the vehicle start request, so the brake pressure increasing part 44 requests the braking control part 45 to reduce the pressure by the amount of pressure increase at the start of the engine by the idle-stop function (S164). By the pressure reduction, it is not necessary to maintain a relatively high hydraulic pressure, and the fuel economy is improved. In addition, it is possible to restrain a high load being applied to the hydraulic circuit and the like for a long time. In addition, even though the increase of the wheel cylinder pressure corresponding to the driving force at the start of the engine by the idle-stop function is cancelled, when the restart condition is satisfied, since the vehicle is started, there is almost no inconvenience brought by the vehicle movement.

Furthermore, as in FIG. 8, the procedure in FIG. 11 may also be divided into the braking for vehicle stop maintenance and the pressure increasing of the wheel cylinder pressure corresponding to the driving force at the start of the engine.

FIG. 12 is an exemplary diagram for explaining the operation procedure of the control apparatus 100 for a vehicle according to the present embodiment in the case where the pressure is increased after the engine is stopped. The processing identical to that in FIG. 11 may also be applied to the situation where the pressure is increased after the engine is stopped by a related amount corresponding to the start of the engine by the idle-stop function.

The procedure in FIG. 12 is almost the same as that in FIG. 10 of Embodiment 2, and differs from FIG. 10 in that after the engine 20 is stopped in the step S250, the brake pressure increasing part 44 determines whether or not "there is no possibility that other restart conditions than the vehicle start request are satisfied" (S252).

When the determination result is NO, since there is a possibility that the restart condition of the engine 20 is satisfied other than detection of the vehicle start request, the brake pressure increasing part 44 outputs to the braking control part 45 a pressure increasing request of an amount of pressure increase corresponding to the driving force at the start of the engine by the idle-stop function (S260). In other words, when the determination result is YES, the restart condition of the engine 20 is satisfied by detecting the vehicle start request, so the brake pressure increasing part 44 does not need to increase the pressure, such that it is not necessary to maintain a relatively high hydraulic pressure, and the fuel economy is improved. In addition, it is possible to restrain a high load being applied to the hydraulic circuit and the like for a long time.

Therefore, according to the present embodiment, by considering the restart condition of the engine 20, it is possible to increase the pressure only as needed by a related amount corresponding to the start of the engine by the idle-stop function.

Modes for carrying out the invention have been described above by way of embodiments thereof, however the invention is in no way limited to these embodiments, and various modifications and substitutions can be made without departing from the scope of the gist of the invention. For example, the engine start condition and engine stop condition of the S&S control part, or the operation enabling the vehicle stop maintenance function of the BH control part 42 can be set as appropriate, and thus are not limited to those as listed in the embodiments.

In addition, hydraulic pressure is used to control the braking force in the present embodiment. However, in a vehicle that uses an electric motor to control the braking force, the pressure reduction control of the present embodiment is performed by the electric motor. In addition, in the case where part of the braking force is supplied by the electric motor, the pressure increasing control of the present embodiment may be realized by either of hydraulic pressure brake or electric brake.

In addition, it may be configured that the brake pressure increasing part 44, instead of increasing the wheel cylinder pressure, outputs to the driver from the dashboard, speaker, or the like a message for requesting further depressing of the brake pedal. In this way, if the driver further depresses the brake pedal, it is possible to prevent the vehicle from moving when the engine is restarted. In addition, even if the driver does not further depress the brake pedal, since the movement of the vehicle can be predicted by the driver, it is possible to relieve the uncomfortable feeling.

What is claimed is:

1. A control apparatus for a vehicle, comprising:
an inter-vehicle distance control unit that performs inter-vehicle distance control with respect to a preceding vehicle;
a stop-restart unit that stops an engine if a host vehicle is stopped and an engine stop condition is satisfied and that restarts the engine if a restart condition is satisfied;
a braking force maintenance unit that maintains a braking force which stops the vehicle in idle state; and
a braking force increase unit that increases the braking force maintained by the braking force maintenance unit if the vehicle is stopped by the inter-vehicle distance control unit,
wherein the braking force increase unit increases the braking force before the engine is stopped by the stop-restart unit, maintains the increased braking force if the engine is stopped by the stop-restart unit, and reduces the increased braking force if the engine is not stopped by the stop-restart unit.

2. The control apparatus according to claim 1, wherein the braking force increase unit increases the braking force before the engine is restarted by the stop-restart unit.

3. The control apparatus according to claim 1, wherein the braking force increase unit reduces the increased braking force if it is determined that other restart conditions among the restart conditions than such a condition that an operation to start the vehicle is detected are not satisfied.

4. A control apparatus for a vehicle, which communicates with an inter-vehicle distance control unit that performs inter-vehicle distance control with respect to a preceding vehicle, a stop-restart unit that stops an engine if a host vehicle is stopped and an engine stop condition is satisfied and that restarts the engine if a restart condition is satisfied, and a braking force maintenance unit that maintains a braking force which stops the vehicle in idle state,
the control apparatus comprising:
a braking force increase unit that increases the braking force maintained by the braking force maintenance unit if the vehicle is stopped by the inter-vehicle distance control unit,
wherein the braking force increase unit increases the braking force before the engine is stopped by the stop-restart unit, maintains the increased braking force if the engine is stopped by the stop-restart unit, and reduces the increased braking force if the engine is not stopped by the stop-restart unit.

5. A control apparatus for a vehicle, comprising:
an inter-vehicle distance control unit that performs inter-vehicle distance control with respect to a preceding vehicle;
a stop-restart unit that stops an engine if a host vehicle is stopped and an engine stop condition is satisfied and that restarts the engine if a restart condition is satisfied;
a braking force maintenance unit that maintains a braking force which stops the vehicle in idle state; and
a braking force increase unit that increases the braking force maintained by the braking force maintenance unit if the vehicle is stopped by the inter-vehicle distance control unit,
wherein the braking force increase unit increases the braking force only if the engine is stopped by the stop-restart unit, and if the engine is not stopped by the stop-restart unit, the braking force is not increased by the braking force increase unit and is maintained by the braking force maintenance unit.

6. The control apparatus according to claim 5, wherein if the engine is stopped by the stop-restart unit, the braking force increase unit increases the braking force only if it is determined that another restart condition among the restart conditions than such a condition that an operation to start the vehicle is detected is satisfied.

* * * * *